(12) United States Patent
Sadler et al.

(10) Patent No.: US 8,488,471 B2
(45) Date of Patent: Jul. 16, 2013

(54) INTELLIGENT NETWORK PLANNING AND PROVISIONING TOOL

(75) Inventors: Jonathan B. Sadler, Naperville, IL (US); Dale A. Scholtens, Lisle, IL (US)

(73) Assignee: Tellabs Operations, Inc., Naperville, IL (US)

( * ) Notice: Subject to any disclaimer, the term of this patent is extended or adjusted under 35 U.S.C. 154(b) by 446 days.

(21) Appl. No.: 11/555,579

(22) Filed: Nov. 1, 2006

(65) Prior Publication Data

US 2008/0101242 A1    May 1, 2008

(51) Int. Cl.
  *G01R 31/08* (2006.01)
  *H04L 12/28* (2006.01)
(52) U.S. Cl.
  USPC .......................................... 370/238; 370/254
(58) Field of Classification Search
  USPC .................................... 370/238, 254
  See application file for complete search history.

(56) References Cited

U.S. PATENT DOCUMENTS

| | | | | |
|---|---|---|---|---|
| 5,942,989 | A * | 8/1999 | Nagasawa et al. | 370/236 |
| 6,633,544 | B1 * | 10/2003 | Rexford et al. | 370/238 |
| 7,107,563 | B1 * | 9/2006 | Kong | 716/12 |
| 7,403,988 | B1 * | 7/2008 | Blouin et al. | 709/223 |
| 2001/0013037 | A1 * | 8/2001 | Matsumoto | 707/5 |
| 2004/0015590 | A1 * | 1/2004 | Nagami et al. | 709/227 |
| 2004/0213167 | A1 * | 10/2004 | Garcia-Luna-Aceves et al. | 370/254 |
| 2007/0094381 | A1 * | 4/2007 | Weiss et al. | 709/224 |
| 2007/0118643 | A1 * | 5/2007 | Mishra et al. | 709/224 |
| 2007/0195700 | A1 * | 8/2007 | Katoh et al. | 370/235 |
| 2010/0091664 | A1 * | 4/2010 | Nandy et al. | 370/242 |

\* cited by examiner

*Primary Examiner* — Mark Rinehart
*Assistant Examiner* — Angel Brockman
(74) *Attorney, Agent, or Firm* — Fitzpatrick, Cella, Harper & Scinto (57) ABSTRACT

An intelligent network planning and provisioning tool is provided. The intelligent network planning and provisioning tool includes a forecaster coupled to a network control plane. The forecaster receives an estimate of initial network resources from a user and generates a set of link costs and constraints for use by the network control plane in making routing decisions for a network. The network control plane transmits provisioning experience information, representing network traffic demands received by, and provisioning decisions made by, the network control plane, back to the forecaster. When the forecaster receives the provisioning experience from the network control plane, the forecaster generates a new set of link costs that are transmitted to the network control plane for use in making further provisioning decisions. The forecaster may optionally generate link costs, termed "smart costs", that may be used to route traffic through the network using preferred links.

21 Claims, 7 Drawing Sheets

Fig. 1a

| Circuit ID | Site From | Site To |
|---|---|---|
| 12345678 | Site 1 | Site 4 |

| Wavelength | Module Slot | Module Type | Module Port | Link | Module Type | Module Slot | Module Port |
|---|---|---|---|---|---|---|---|
| | 7 | Splitter | 1 | | | | |
| 10 | 5 | Xpdr A | 3 | Site 1 - Site 2 | Xpdr B | 7 | 1 |
| 10 | | | | Site 2 - Site 3 | Xpdr A | 4 | 6 |
| 5 | 8 | Xpdr B | 1 | Site 3 - Site 4 | Splitter | 11 | 1 |

| Wavelength | Module Slot | Module Type | Module Port | Link | Module Type | Module Slot | Module Port |
|---|---|---|---|---|---|---|---|
| | 7 | Splitter | 2 | | | | |
| 12 | 6 | Xpdr A | 6 | Site 1 - Site 5 | Xpdr B | 8 | 3 |
| 12 | | | | Site 5 - Site 4 | Splitter | 11 | 2 |

INTELLIGENT NETWORK PLANNING AND PROVISIONING TOOL

BACKGROUND OF THE INVENTION

1. Field of the Invention

This invention relates to network management and more specifically to network management using network planning.

2. Description of Related Art

Existing external network planning systems are only aware of the resources that are in a network and are not aware of the physical demands that are seen by the network. A planning system receives a demand forecast and gets the current state of the network, such as available resources. However, the planning system does not know details about the actual recent demands. Therefore, there is no true match between a demand forecast process and actual resources as the actual demands are unknown.

In addition, external planning systems are typically used by marketing personnel within a service provider before the actual network is placed in use. Without the ability to determine the actual use of a network, the demand forecast based on inputs from the marketing personnel may miss fine details regarding use of the network.

There exists a need, therefore, to provide a novel network planning system that uses actual network demands to influence forecasts of network usage.

SUMMARY OF THE INVENTION

To address the foregoing deficiencies, a system, apparatus, method and program are provided for an intelligent network planning and provisioning tool. The intelligent network planning and provisioning tool is used for a network that supports a variety of demand types, which may require different types of equipment, and utilizes the recent pattern of the demands, suggestive of the type of equipment that should be preferred in the planning process In operation, the intelligent network planning and provisioning tool generates first link costs for a network by a forecaster based on a combination of temporal demands and the network resources the forecaster chooses to engineer in support of those demands. Routing decisions are made by a router in the network using the first link costs and network demand information with the network demand information and routing decisions as provisioning experience transmitted back to the forecaster by the router. The forecaster generates second link costs using link costs plus a potentially revised set of temporal demands and the provisioning experience and transmits the second link costs to the router for use in determining additional routing decisions.

In another aspect of the invention, the provisioning experience further includes regularly scheduled network demands transmitted by an operation support system to the forecaster and sporadic network traffic demands transmitted to the forecaster by an element management system.

In another aspect of the invention, the second link costs are generated using link preferences for identified network traffic.

This brief summary has been provided so that the nature of the invention may be understood quickly. A more complete understanding of the invention can be obtained by reference to the following detailed description in connection with the attached drawings.

BRIEF DESCRIPTION OF THE DRAWINGS

The invention will be more readily understood from a detailed description of the preferred embodiments taken in conjunction with the following figures.

Identically labeled elements appearing in different ones of the figures refer to the same elements but may not be referenced in the description for all figures.

DETAILED DESCRIPTION OF THE PREFERRED EMBODIMENTS

Preferred embodiments of the invention are described below with reference to the accompanying drawings. The embodiments include an apparatus, system, method, and computer program providing intelligent network planning and provisioning.

Figure 1A:
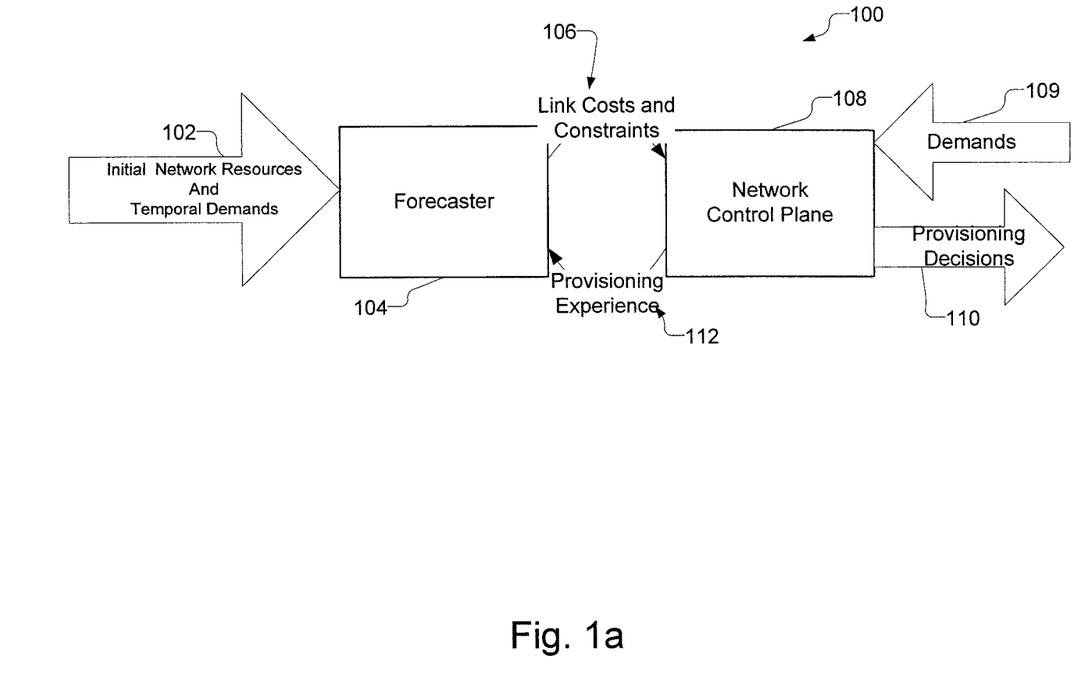
FIG. 1a is a block diagram of an intelligent network planning and provisioning tool in accordance with an exemplary embodiment of the invention.

FIG. 1 is a block diagram of an intelligent network planning and provisioning tool 100 in accordance with an exemplary embodiment of the invention. In operation, the intelligent network planning and provisioning tool 100 generates a series of link costs and constraints 106 for use by a network control plane 108 in making provisioning decisions 110 in response to network demands 109. The constraints are policies to which a router in a network should adhere. The forecaster 104 regenerates the link costs and constraints 106 using old link costs plus a potentially revised set of temporal demands and the provisioning experience 112 and transmits the regenerated link costs and constraints 106 to the router for use in determining additional routing decisions 110. This process is repeated continuously in a feedback loop so that the forecaster 104 refines the network by using actual provisioning experience 112 to provide the most realistic link costs 106 to the network control plane 108 for making provisioning decisions 110.

In slightly more detail, the intelligent network planning and provisioning tool 100 includes a forecaster 104 coupled to a network control plane 108. In operation, the forecaster 104 receives an estimate of initial network resources and temporal demands 102 from a user. The estimate of initial network resources includes information describing the types of equipment and links that may be engineered in the network to support demands that are presented to the network. In addition, the input from the user may include constraints for a router. For example, networks that switch optically might be constrained by policies specifying things such as degree of headroom provided in analog signal level calculations before regeneration is applied, a preferred placement of regeneration equipment in a network, and sparing/fill factors dictating the use of heretofore unused links and equipment. From the network resources and temporal demands, the forecaster 104 generates a set of link costs and constraints 106 for transmission to the network control plane 108.

The information characterizing equipment resources may be organized as relational data, which readily allows relationships and constraints between various equipment entities to be represented. Demand and link information is readily represented in tables, enabling the user to easily read and understand it.

As an example, Table 1 below illustrates data for fiber links in an optical network. For each link, the table shows which sites are linked in the first and second columns, the distance of the link in Kilometers, the type of fiber used in the link, the optical loss in decibels, the Polarization Mode Distortion (PMD) and the Chromatic Distortion (CD).

TABLE 1 data representing a fiber link:

| Site From | Site To | Distance (Km) | Cable ID | Fiber Type | Loss (dB) | PMD | CD |
|---|---|---|---|---|---|---|---|
| Site 1 | Site 2 | 23 | 12 | SMF-28 | 9 | 2.64 | 391 |
| Site 2 | Site 3 | 40 | 34 | SMF-28 | 14 | 3.02 | 540 |
| Site 3 | Site 4 | 23 | 56 | SMF-28 | 11 | 2.88 | 372 |
| Site 4 | Site 5 | 20 | 78 | SMF-28 | 8 | 2.4 | 327 |
| Site 5 | Site 1 | 23 | 90 | SMF-28 | 9 | 2.7 | 399 |

Table 2 below illustrates data for a demand. A demand may be represented by the source and destination sites (as shown in the first two columns), the level of the demand (such as a Optical Carrier 3 (OC3), Gigabyte Ethernet (GbE), etc.), the protection type (such as none, client, 1 to 1 correspondence, etc.), the route through the network, and a circuit Identifier.

TABLE 2 data representing a demand:

| Site From | Site To | Level | Protection Type | Route binding | Circuit ID |
|---|---|---|---|---|---|
| Site 1 | Site 4 | OC3, GbE, etc. | None, Client, 1 + 1, etc | Site list | 12345678 |

Alternatively, the initial set of resources may not contain any resource specifications at all. In this case, the forecaster determines what network resources are required.

The network control plane 108 receives network traffic demands 109 from a network, an Element Management System (EMS) or from another network external to a network under control (not shown), and uses the link costs and constraints 106 to generate provisioning decisions 110 satisfying the demands 109 for the network. The network control plane 108 transmits provisioning experience information 112 (representing the network traffic demands 109 received by, and provisioning decisions 110 made by, the network control plane 108) back to the forecaster 104. When the forecaster 104 receives the provisioning experience 112 from the network control plane 108, the forecaster 104 generates a new set of link costs and constraints 106 that are transmitted to the network control plane 108 for use in making provisioning decisions.

Figure 1B:
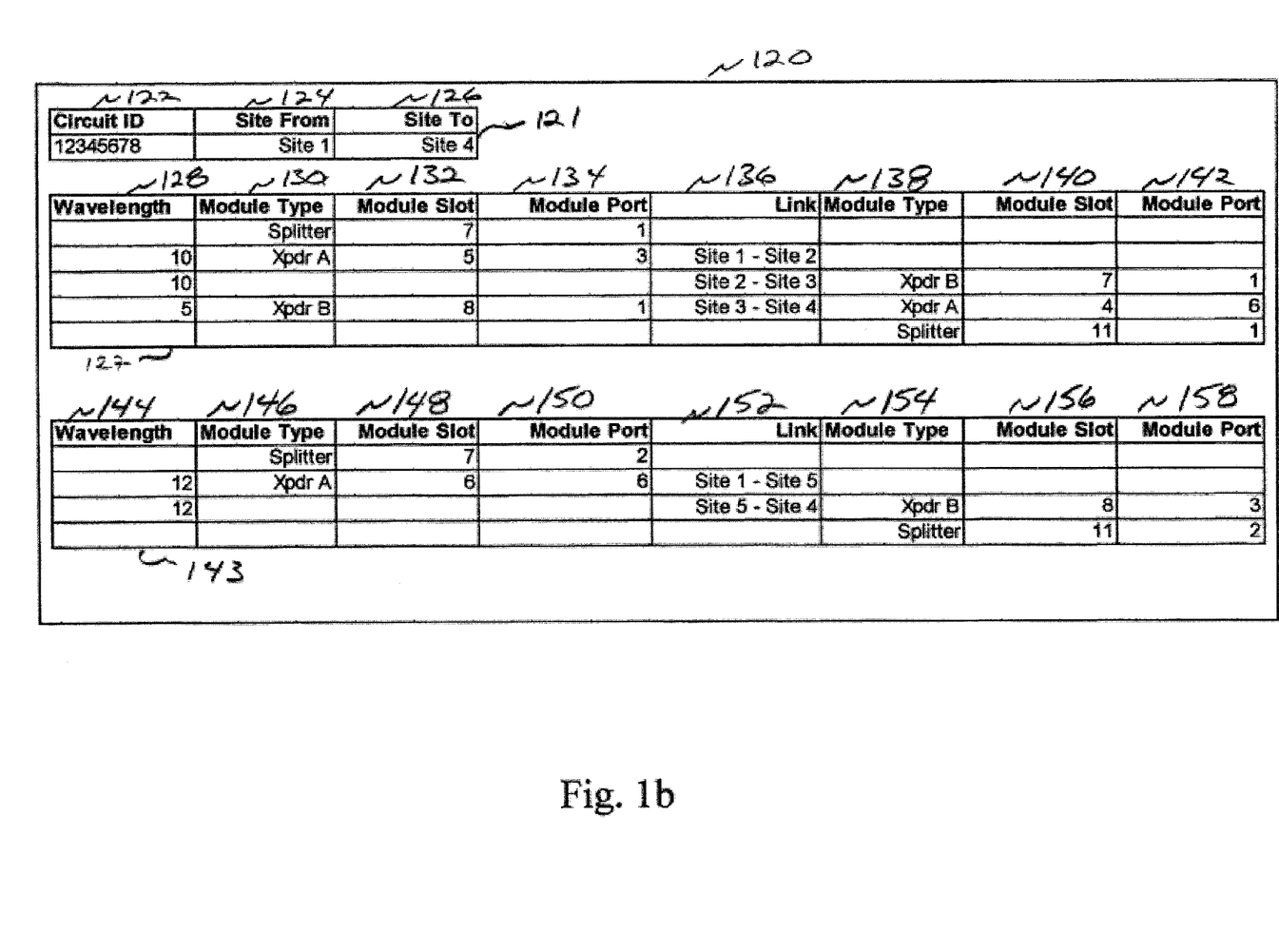
FIG. 1b is a table representing provisioning experience for an intelligent network planning and provisioning tool in accordance with an exemplary embodiment of the invention.

FIG. 1b is a table 120 representing provisioning experience for an intelligent network planning and provisioning tool in accordance with an exemplary embodiment of the invention. The table includes an identifier block 121 identifying a lightpath route for a demand admitted to the network. The identifier block includes a circuit identifier 122, and two terminal sites, 124 and 126.

The lightpath route includes a working path description 127. For each node in the working path, the working path description 127 includes a wavelength identifier 128, a module type identifier 130 and 138, a module slot identifier 132 and 140, and a module port identifier 134 and 142.

The lightpath route may further include a description of a protection path 143. For each node in the protection path, the protection path description 143 includes a wavelength identifier 144, a module type identifier 146 and 154, a module slot identifier 148 and 156, and a module port identifier 150 and 158.

In operation, the combination of the forecaster 104 and the network control plane 108 creates a feed-back loop wherein the state of a network may be analyzed after demands have been admitted and this analysis is fed into the network planning process for a revised network. This is done by tempering the forecast data with recent provisioning experience, potentially revising the forecast to align with the recent provisioning experience. Such realignment has a greater tempering effect on near-term demand data, and lesser effect on longer-term demands.

More particularly, the feed-forward from the forecaster 104 to the network control plane 108 of link costs and constraints 106 enable the network control plane 108 to make routing decisions in keeping with what the forecaster 104 forecasted for the network. In addition, the feed-back of actual provisioning experience 110 from network control plane 108 toward the forecaster 104 tempers the forecast created by the forecaster 104.

In one exemplary embodiment of a forecaster 104, the forecaster 104 is heuristics-based, thus allowing the forecaster 104 to quickly generate link costs and constraints 106 for use by the control plane.

In another exemplary embodiment of a forecaster 104, the forecaster 104 generates link costs, herein termed "smart costs" that are used to route traffic through a network using preferred links. For example, routing functions work using a network topology, where the links in the topology are assigned costs. The goal of the routing function is to find a path through that topology that incurs the least amount of costs, that is, the cumulative cost of all the links that are traversed is lower than any other path that exists through the topology. However, when utilizing smart costs, costs are assigned to the links based on preferred links for identified network traffic such that when the path between two points in a network is computed for the identified traffic, the identified network traffic ends up going across a set of links that were placed in the network specifically to handle that identified network traffic.

For example, a demand forecast may indicate that between two points in the network, there will be 100 units of services sold, but between all other points in the network, only two units of services will be sold. When the network is built out, more resources in the network will be allocated in the network to deal with the demand created by the 100 units of services sold, than the other demands. Therefore, it would be undesirable to route a connection between the two points where there will be 100 units of services sold across links that are designed to deal with lower demand endpoints. If a connection is setup across the wrong set of links, it could end up blocking other demands from being admitted to the network. Using smart costs, the path computation tends to use the particular path through the network intended for the traffic by the forecaster 104 go on so that the traffic uses the parts of a network which are built out to deal with that forecasted demand for that traffic.

In another application of the intelligent network planning and provisioning tool, the intelligent network planning and provisioning tool has a view of a set of equipment and set of demands over time. For example, a piece of equipment may be included in the network at a certain time, and another piece of equipment is included in the network at another time. As such, the intelligent network planning and provisioning tool starts of with an idea of what the network looks like at a specific time, that is, what resources are available and what resources are currently in use. Then, when given a forecast, the intelligent network planning and provisioning tool provides a suggestion of what equipment is needed for forecasting in an optimal way.

Figure 2:
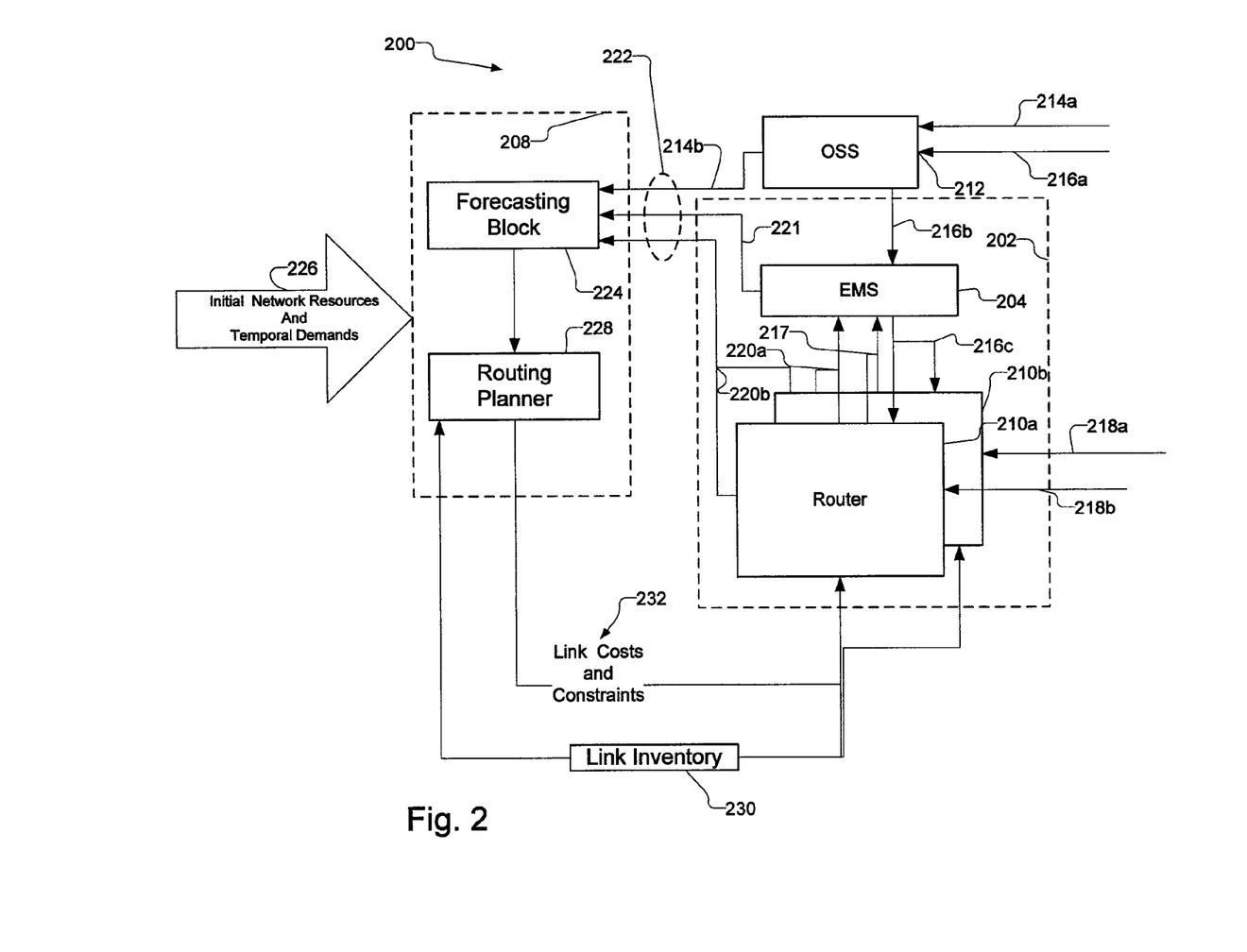
FIG. 2 is a block diagram of the components of a network planning and provisioning tool in accordance with an exemplary embodiment of the invention.

Having described an intelligent network planning and provisioning tool an additional aspect of the invention will now be described. FIG. 2 is a block diagram of the components of the network planning and provisioning tool 200 in accordance with an exemplary embodiment of the invention. The network planning and provisioning tool 200 is an exemplary implementation corresponding to the network planning and provisioning tool 100 of FIG. 1. In this implementation, a control plane 202 includes an Element Management System (EMS) 204 that provides information about network traffic demands 221 to a forecaster 208. The EMS 204 receives information about network commitments and available capacity from one or more routers, such as routers 210a and 210b, that constitute links in a network.

Coupled to the control plane 202 and the forecaster 208 is an Operation Support System (OSS) 212 which performs a backoffice process used by a telecommunications service to manage a network. The OSS 212 maintains a temporal demand forecast 214a for network demands which is forwarded (214b) to the forecaster 208. The OSS 212 also accepts actual demands 216a for service on behalf of a set of routers, such as routers 210a and 210b, in the network, passing the demands 216b along to the EMS component of the control plane 108 that passes the demands 216c to the routers 210a and 210b, for actual admission to the network.

The EMS component is one of two sources driving the routers. The other source is a connected network (not shown) which signals its demands 218a and 218b, laterally to the routers (i.e., another network's control plane). The routers 210a and 210b also supply actual demand information 220a and 220b about actual demands to the EMS 204 and the forecaster 208, respectively. Furthermore, the routers 210a and 210b supply responses 217 that the routers 210a and 210b make to the actual demands 218a and 218b received by the routers 210a and 210b from the network (not shown). As described in FIG. 2, the routers 210a and 210b are included as components of the control plane 202 for a network although it is to be understood that routers primarily constitute devices in a data plane of a network with some control plane components. In FIG. 2, routers 210a and 210b are included in the control plane 202 as they provide actual demand information 220a to the forecaster 208. The inputs to the forecaster 208 from the network control plane 202, namely the temporal demand forecast 214b, the actual demand information 220b from the routers 210a and 210b, and actual demands 221 which are collected by the EMS 204, collectively constitute provisioning experience 222 as represented by provisioning experience 112 of the network control plane 108 as shown in FIG. 1.

The forecaster 208 includes a forecasting block 224 that receives the inputs from the control plane 202. The forecasting block uses the regularly scheduled network demands, sporadic demands, and actual demand history received from the control plane 202 along with user input initial network resources 226 to generate a demand forecast for a routing planner 228. The routing planner 228 uses the demand forecast and a link inventory 230 of actual links in a network to create link costs and constraints 232 for use by the routers 210a and 210b that constitute the links in a network. The routers 210a and 210b then use the link costs and constraints 232 and link inventory 230 to route traffic through a network.

Figure 3:
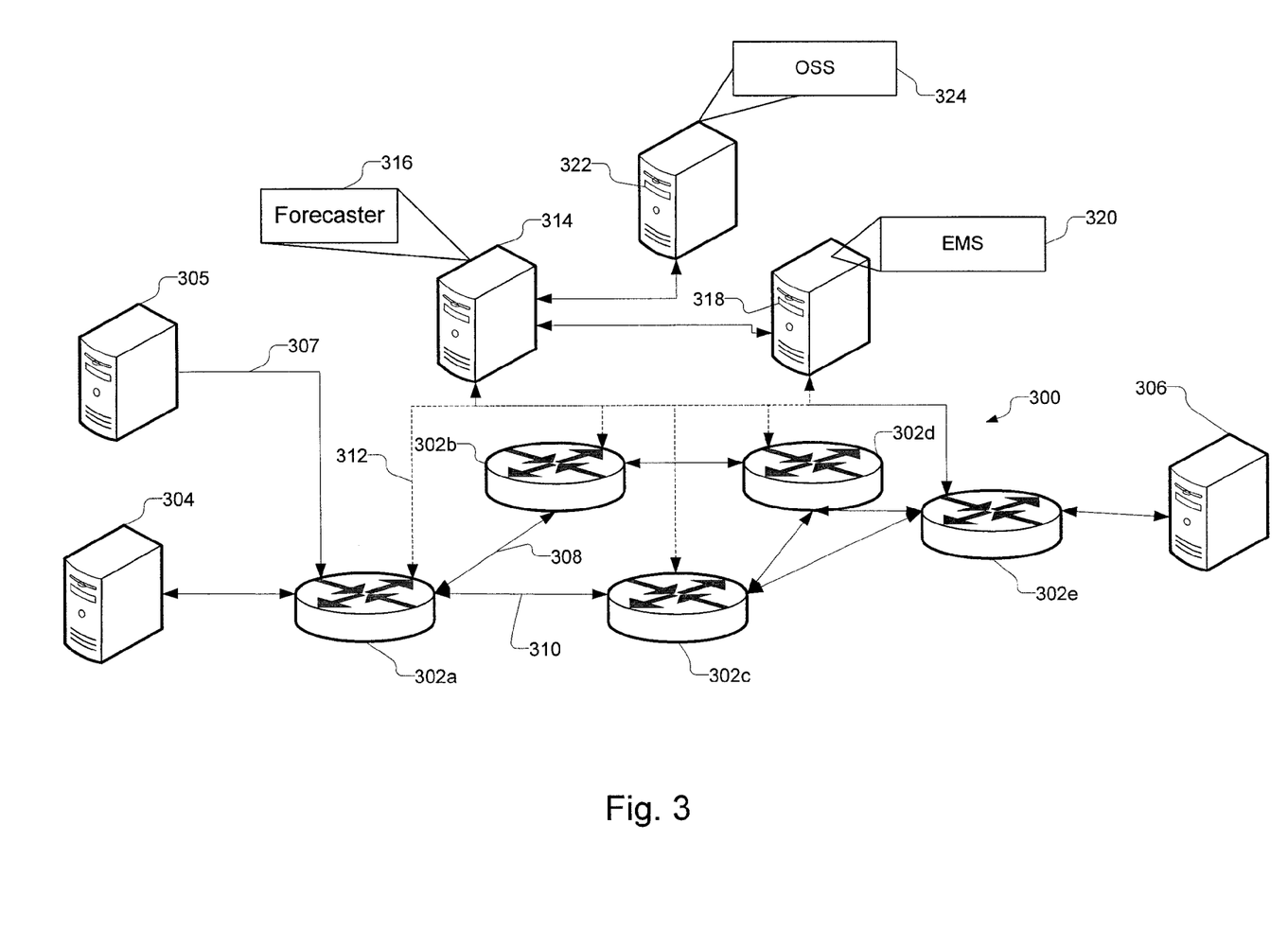
FIG. 3 is a block diagram of an intelligent network planning and provisioning tool deployed in a network in accordance with an exemplary embodiment of the invention.

Having described individual components of an intelligent network planning and provisioning tool, an additional aspect of the invention will now be described. FIG. 3 is a block diagram of an intelligent network planning and provisioning tool in accordance with an exemplary embodiment of the invention deployed in a network 300. The network 300 includes one or more routers, such as routers 302a to 302e, that couple one or more devices together, as exemplified by devices 304 and 306. A router in the network 300, such as router 302a, may receive demands 307, as described for exemplary demands 218a and 218b of FIG. 2, for the network 300 from an external device 305. Each router is linked to one or more other routers in the network 300 as typified by link 308 coupling router 302a to 302b and link 310 coupling router 302a to router 302c. The routers 302a to 302e are coupled either directly or through the network 300, as shown by the dashed lines 312, to a forecaster host 314 hosting a forecaster 316. The forecaster 316 performs forecasting functions as described for exemplary forecasters 104 of FIG. 1 and 208 of FIG. 2. The routers 302a to 302e are also coupled either directly or through the network 300 to an EMS host 318 hosting an EMS 320. The EMS 320 performs EMS functions as described for exemplary EMS 204 of FIG. 2. Finally, the forecaster host 314 is coupled to an OSS host 322 hosting an OSS 324, either directly or indirectly through the network 300. The OSS 324 performs similar functions as the OSS 212 of FIG. 2.

In FIG. 3, the forecaster 316, OSS 324 and EMS 320 are shown as being deployed on separate hosts 314, 322 and 320, respectively. However, such a deployment is exemplary as the forecaster 316, OSS 324 and EMS 320 may be deployed, instead, on a single host or on separate hosts in any combination besides the deployment shown. Furthermore, the hosts 314, 322 and 320 could be implemented in a variety of ways without deviating from the spirit of the invention. For example, the hosts could implement the forecaster 316, OSS 324 and EMS 320 as hardwired circuits within the hosts. Alternatively, the forecaster 316, OSS 324 and EMS 320 could be implemented in the form of software, such as computer-executable instructions stored on a computer-readable medium, and the hosts 314, 322 and 318 could be controllers with a processor and memory. Finally, and as noted in the description of FIG. 2 from above, routers, such as routers 302a to 302e, may constitute both devices in a data plane of the network 300 and a network control plane of network 300. In addition, the number of routers in the network 300, and the topology of the network 300 are shown by way of example and not of limitation.

Figure 4:
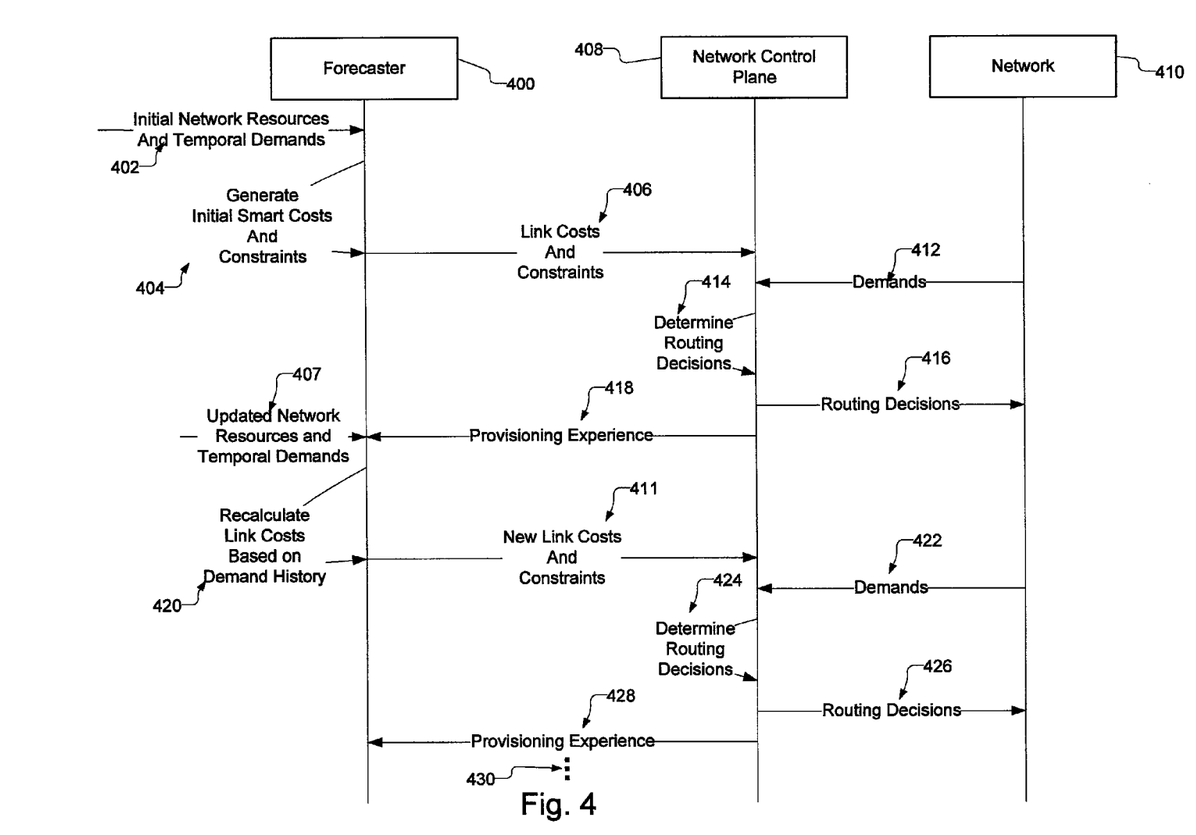
FIG. 4 is a sequence diagram of the interactions between components of an intelligent network planning and provisioning tool in accordance with an exemplary embodiment of the invention.

Having described how an intelligent network planning and provisioning tool is deployed in a network, an additional aspect of the invention will now be described. FIG. 4 is a sequence diagram of the interactions within an intelligent network planning and provisioning tool, such as exemplary network planning and provisioning tools 100 and 200 of FIGS. 1 and 2, respectively, in accordance with an exemplary embodiment of the invention. The network planning and provisioning tool may be deployed as a forecaster 400 and within devices composing a control plane 408 as previously described in FIGS. 2 and 3. As shown in FIG. 4, the network planning and provisioning tool is deployed for use with a network 410 that implements the features of exemplary network 300 of FIG. 3. Initially, the forecaster 400 receives from a user (not shown) initial network resources and temporal demands 402. The forecaster 400 uses the initial network resources and temporal demands 402 to generate (404) an initial set of link costs and constraints 406 that are transmitted to routers, such as the routers 302a to 302e (of FIG. 3) that include components of the network control plane 408. During operation of the network 410, the routers 302a to 302e (of FIG. 3) receive demands 412 for traffic admissions from the network 410. The routers 302a to 302e (of FIG. 3) determine (414) routing decisions 416 that are used to route traffic admitted to the network 410. The routers 302a to 302d, an OSS and an EMS (not shown) in the network control plane 408 transmit their respective provisioning experiences 418 to the forecaster 400.

The forecaster 400 uses the provisioning experience 418 of the network control plane 408 along with an optional updated set of initial network resources 407 to recalculate (420) new link costs and constraints 411. As the new link costs and constraints are generated using actual provisioning experience 418, they provide potentially better guidelines for the routing decisions made by elements of the control plane 408 than the initial link costs and constraints 406 generated without actual provisioning experience. The new link costs and constraints 411 are transmitted to the routers, such as routers 302a to 302e (of FIG. 3), that are part of the network control plane 408. The routers, such as routers 302a to 302e (of FIG. 3), receive additional demands 422 for traffic admissions from the network 410. The routers, such as routers 302a to 302e (of FIG. 3), determine (424) new routing decisions 426 that are used to route traffic admitted to the network 410. The routers, such as routers 302a to 302e (of FIG. 3), the OSS and the EMS (not shown) of network control plane 408 again transmit their respective provisioning experiences 428 to the forecaster 400. As before, provisioning experiences 428 can be used to provide an improved set of link costs and constraints, thus allowing the forecaster to continuously tune the network. The process of providing provisioning experience from the network control plane 408 to the forecaster 400 for recalculating link costs and constraints is repeated indefinitely as indicated by ellipses 430.

Figure 5:
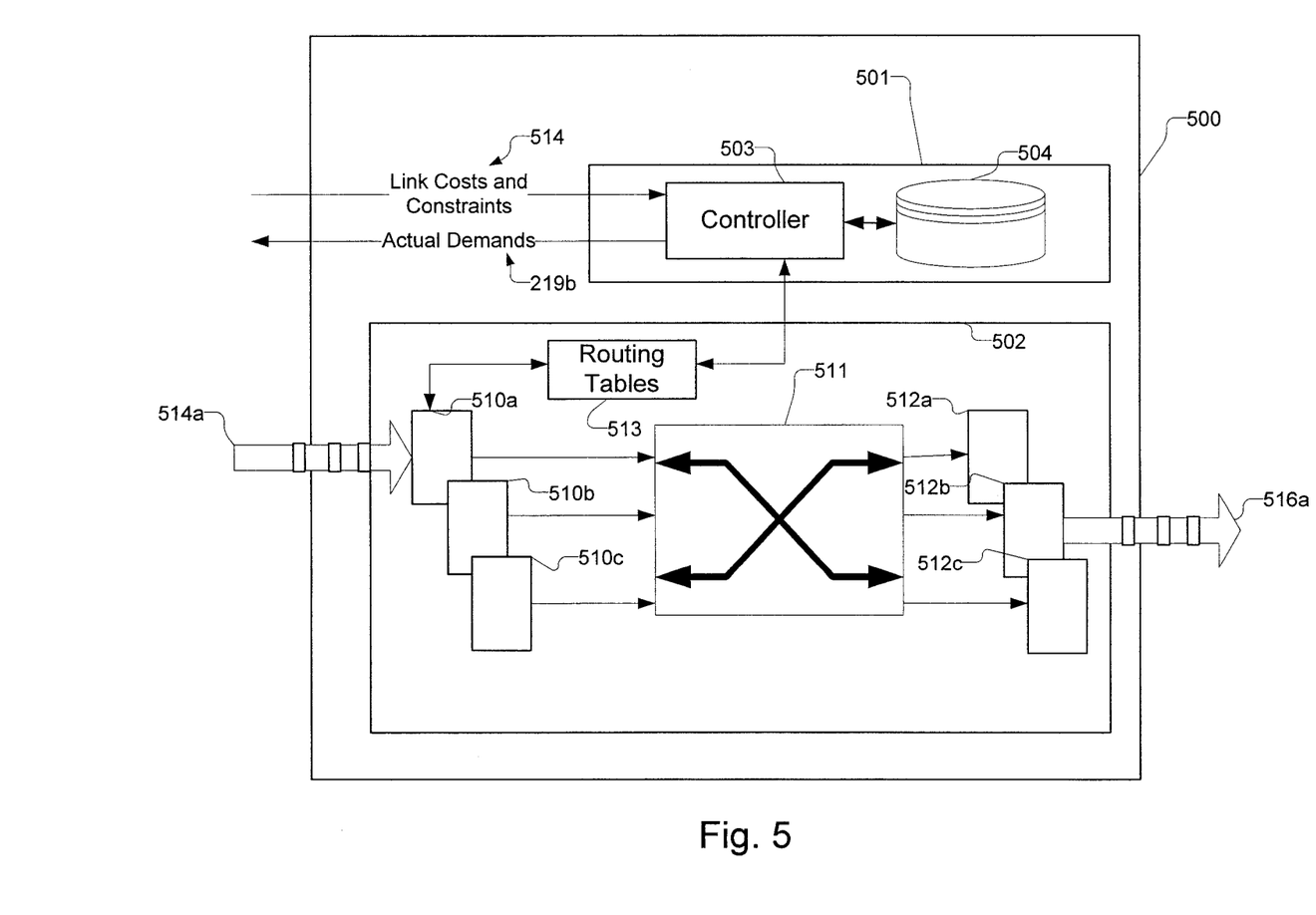
FIG. 5 is a block diagram of a router in accordance with an exemplary embodiment of the invention.

Having described how an intelligent network planning and provisioning tool is deployed in a network and the sequence of operations of the intelligent network planning and provisioning tool, an additional aspect of the invention will now be described. FIG. 5 is a block diagram of a router 500 in accordance with an exemplary embodiment of the invention. The router 500 is capable of performing the operations of exemplary routers 210a and 210b of FIG. 2 or of routers 302a to 302e of FIG. 3. The router 500 includes a controller portion 501 coupled to a switching portion 502. The controller portion 501 includes a controller 503 coupled to a data store 504 and to the switching portion 502.

The switching portion 502 includes a plurality of input port interfaces, such as input port interfaces 510a, 510b and 510c. The input port interfaces 510a, 510b and 510c are further coupled to a switch fabric 511. The switch fabric 511 is further coupled to a plurality of output interface ports, such as output interface ports 512a, 512b and 512c.

In operation, the controller 503 receives link costs and constraints 514 from a forecaster (not shown) such as exemplary forecasters 104 (of FIG. 1), 208 (of FIG. 2), 316 (of FIG. 3) or 400 (of FIG. 4), and stores link costs and constraints 514 in data store 504. When an input port interface, such as input port interface 510a, receives incoming network traffic, such as incoming network traffic 514a, for admission into a network (not shown), such as network 300 (of FIG. 3), the input port interface 510a requests a routing decision from the controller 503 based on origination and destination addresses associated with the incoming network traffic 514a. The controller 503 uses the origination and destination addresses associated with the incoming network traffic 514a and the link costs and constraints 514 to determine a routing decision in the form of an entry into a routing table 513. The controller 503 also stores information about the incoming network traffic 514a in the data store 504 as actual demand information 516, such as exemplary actual demand information 220b (of FIG. 2), for later transmission to the forecaster (not shown) as part of provisioning experience, such as provisioning experience 112 (of FIG. 1) for the network (not shown). The input port interface 510a uses the entry in the routing table 513 to determine which output port interface, such as for example output port interface 512b, the incoming network traffic 514a should be sent to, using the switch fabric 511. Once the determination is made, the incoming network traffic 514a is switched through the switch fabric 511 to the output port interface 512b and transmitted out of the router 201a as outgoing network traffic 516a.

Either periodically or in response to polling from the forecaster (not shown) the controller 503 retrieves network demand information about the network traffic, such as incoming network traffic 514a, at the router 500 from the data store 504 and transmits the network demand information to the forecaster (not shown).

The foregoing description of the router 500 is provided by way of example and not of limitation. For example, while only three input and output port interfaces are shown, the number used in an actual router is entirely arbitrary and is merely a design choice. In addition, while the foregoing description has been provided with references to a specific architecture for a router, switch device and switch fabric, it should be understood that a router in accordance with the invention may be configured in many different ways without deviating from the spirit of the invention.

Figure 6:
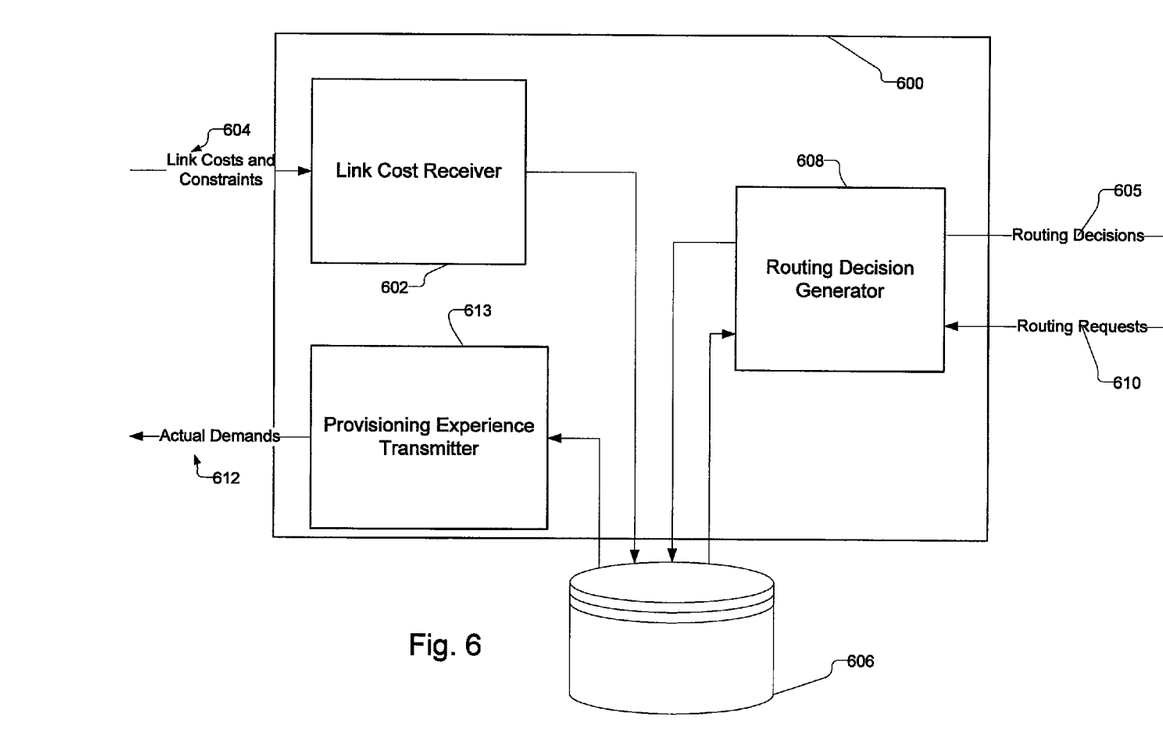
FIG. 6 is a logic module diagram for the router of FIG. 5 in accordance with an exemplary embodiment of the invention.

Having described a router in accordance with an exemplary embodiment of the invention, an additional aspect of the invention will now be described. FIG. 6 is a logic module diagram for a controller 600 of a router in accordance with an exemplary embodiment of the invention. The controller may be used to control a router, such as exemplary routers 210a and 210b of FIG. 2, 302a to 302e of FIG. 3 and 500 of FIG. 5. The controller 600 includes a link cost and manual constraint receiver 602 that is used to receive link costs and constraints 604, such as the exemplary link costs and constraints 514 (of FIG. 5), from a forecaster (not shown) such as forecaster 400 (of FIG. 4). The link cost and manual constraint receiver 602 stores link costs and constraints 604 and stores them into the data store 606. A routing decision generator 608 receives routing requests 610 from a plurality of input port interfaces (not shown), such as exemplary input port interfaces 510a, 510b and 510c (of FIG. 5), and uses the routing requests and stored link costs and constraints 604 to generate routing decisions 605 in the form of entries in a routing table, such as exemplary routing table 513 (of FIG. 5). The routing decision generator 608 also stores the routing requests 610 and routing decisions 605 in a data store 606. The routing requests 610 and routing decisions 605 may then be used at a later time for generating actual demand information 612 for later transmission to the forecaster (not shown) such as forecaster 400 (of FIG. 4) and an EMS (not shown) such as exemplary EMS 320 (of FIG. 3) as part of provisioning experience for a network, such as exemplary provisioning experience 418 for network 410 (both of FIG. 4).

The controller 600 also includes a provisioning experience transmitter 614 that, either periodically or in response to polling from the forecaster (not shown), such as exemplary forecaster 400 (of FIG. 4), retrieves actual demand information 612 about network traffic, such as exemplary incoming network traffic 514a (of FIG. 5) at a router controlled by controller 600, such as routers 302a to 302e (of FIG. 3) from the data store 606 and transmits the actual demand information 612 to the forecaster not shown, such as exemplary forecaster 208 (of FIG. 2) as actual demand information, such as actual demand information 220b (of FIG. 2) which are part of a provisioning experience, such as exemplary provisioning experience 418 (of FIG. 4) for a network, such as exemplary network 410 (of FIG. 4).

The foregoing description of the logic modules in the controller 600 is provided by way of example and not of limitation, it being understood that controller 600 could be implemented in a variety of ways without deviating from the spirit of the invention. For example, the logic modules could be constructed from hardware such as hardwired circuits within the controller. Alternatively, the logic modules could be implemented in the form of software, such as computer-executable instructions stored on a computer-readable medium, and the controller 600 could be a programmable controller with a processor and memory. Finally, the controller 600 could also be constructed from a combination of hardware and software components.

While the invention has been particularly shown and described with respect to a preferred embodiment thereof, it will be understood by those skilled in the art that changes in form and details may be made therein without departing from the scope and spirit of the invention.

What is claimed is:

1. A procedure for intelligent network planning, comprising:
   generating link costs for a network based on initial network resources information and temporal network traffic demands;
   determining, in response to actual network traffic demands, routing decisions for a plurality of routers in the network using the link costs and the actual network traffic demands;
   providing a feed-back provisioning experience, the provisioning experience including at least the actual network traffic demands;
   recalculating the link costs for the network based on a demand forecast and a link inventory, the demand forecast being based on the provisioning experience;
   determining, in response to further actual network traffic demands, routing decisions for a plurality of routers in the network using recalculated link costs and the further actual network traffic demands.

2. The procedure of claim 1, wherein the provisioning experience further comprises regularly scheduled network traffic demands.

3. The procedure of claim 1, wherein the provisioning experience further includes actual network traffic demands and routing decisions.

4. The procedure of claim 1, wherein the recalculated link costs are generated using link preferences for routing network traffic.

5. The procedure of claim 1, wherein the link costs are smart link costs and determining routing decisions further comprises utilizing the smart link costs to assign specific links to a traffic demand presented to the network.

6. The procedure of claim 1, further comprising generating an optimal forecast using the initial network resources information and the actual network traffic demands.

7. A system for intelligent network planning, comprising:
   a network planning tool constructed to feed-forward link costs generated using initial network resources information and temporal network traffic demands; and
   a control plane coupled to a plurality of routers included in a network, the control plane constructed to receive the link costs from the network planning tool and feed-back to the network planning tool a provisioning experience including at least the actual network traffic demands, recalculate the link costs by the network planning tool based on a demand forecast and a link inventory, and determine, in response to further actual network traffic demands, routing decisions for a plurality of routers in the network using recalculated link costs and the further actual network traffic demands, the demand forecast being based on the provisioning experience.

8. The system of claim 7, further comprising an operation support system constructed to transmit regularly scheduled network traffic demands to the network planning tool.

9. The system of claim 7, further comprising an element management system constructed to transmit actual network traffic demands and routing decisions to the network planning tool.

10. The system of claim 7, wherein the network planning tool is further constructed to generate the link costs using link preferences for routing network traffic.

11. The system of claim 7, wherein the control plane is further constructed to use smart link costs to determine routing decisions utilizing the smart link costs to assign specific links to a traffic demand presented to the network.

12. The system of claim 7, wherein the network planning tool is further constructed to generate an optimal forecast using the initial network resources information and the actual network traffic demands.

13. A procedure for operating a control plane coupled to a plurality of routers included in a network, the procedure comprising:
   determining routing decisions for the routers included in the network using link costs received from a network planning tool and actual network traffic demands, the link costs being based on initial network resources information and temporal network traffic demands;
   providing to the network planning tool, a feed-back of a provisioning experience including at least the actual network traffic demands; and
   determining, in response to further actual network traffic demands, additional routing decisions for the routers in the network using link costs as recalculated by the network planning tool and the further actual network traffic demands, the link costs recalculated based on a link inventory and a demand forecast based on the provisioning experience.

14. The procedure of claim 13, wherein the provisioning experience further includes regularly scheduled network traffic demands, the procedure further comprising transmitting the regularly scheduled network traffic demands to the network planning tool.

15. The procedure of claim 13, wherein the provisioning experience further includes the actual network traffic demands, the procedure further comprising transmitting the actual network traffic demands to the network planning tool.

16. The procedure of claim 13, wherein the link costs are recalculated using link preferences for routing network traffic.

17. The procedure of claim 13, wherein the link costs are smart link costs, the procedure further comprising determining routing decisions for the routers utilizing the smart link costs to assign specific links to a traffic demand presented to the network.

18. A control plane for a network, comprising:
a router comprising:
a routing decision generator constructed to determine routing decisions for the network using an initial feed-forward of link costs generated by a network planning tool using initial network resources information and temporal network traffic demands; and
an actual demand provider constructed to provide to the network planning tool a feed-back of a provisioning experience including at least actual network traffic demands,
wherein the routing decision generator determines, in response to further actual traffic demands, additional routing decisions for the network using recalculated link costs recalculated by the network planning tool and the further actual traffic demands, the recalculated link costs being based on a link inventory and a demand forecast based on the provisioning experience.

19. The control plane for a network of claim 18, further comprising an element management system constructed to transmit to the network planning tool, actual network traffic demands and routing decisions as part of the provisioning experience.

20. The control plane for a network of claim 18, wherein the recalculated link costs are generated using link preferences for routing network traffic.

21. The control plane for a network of claim 18, wherein the link costs are smart link costs and the routing decision generator is further constructed to determine routing decisions for the network utilizing the smart link costs to assign specific links to a traffic demand presented to the network.

* * * * *